United States Patent [19]
Ubaldi et al.

[11] Patent Number: 5,531,170
[45] Date of Patent: Jul. 2, 1996

[54] COMPOUND CURVATURE, DOMICAL STRUCTURE FOR WASTE-TO-ENERGY FACILITIES

[75] Inventors: Richard A. Ubaldi, Wayne, N.J.; Paul L. Hauck, Tampa, Fla.; Kevin J. Walls, Blairstown, N.J.

[73] Assignee: Ogden Projects, Inc., Fairfield, N.J.

[21] Appl. No.: 155,842

[22] Filed: Nov. 23, 1993

[51] Int. Cl.$^6$ .................................................. F23B 7/00
[52] U.S. Cl. .......................... 110/349; 110/184; 52/302.3; 52/81.1
[58] Field of Search ................................... 110/346, 242, 110/349, 331, 335, 336, 334, 181, 184, 194, 235; 52/80.1, 81.1, 302.1, 302.3

[56] References Cited

U.S. PATENT DOCUMENTS

| | | | |
|---|---|---|---|
| 3,318,780 | 5/1967 | Bohmann et al. | 52/81.1 |
| 3,365,855 | 1/1968 | Vermette | 52/80.1 |
| 4,578,912 | 4/1986 | Ericsson | 52/302.3 |
| 5,069,147 | 12/1991 | Tan et al. | 110/349 |
| 5,222,446 | 6/1993 | Edwards et al. | 110/346 |
| 5,347,938 | 9/1994 | Takazawa | 110/346 |
| 5,361,550 | 11/1994 | Kaden | 52/80.1 |
| 5,370,067 | 12/1994 | Finet | 110/346 |

*Primary Examiner*—Henry A. Bennett
*Assistant Examiner*—Susanne C. Tinker
*Attorney, Agent, or Firm*—Dickstein, Shapiro & Morin

[57] ABSTRACT

The present invention relates to a domical structure capable of enclosing the majority of operational and structural elements of a waste-to-energy or waste processing facility. The domical structure according to the present invention improves the aesthetic appearance of the facility by enclosing the majority of the machinery, equipment and activities from outside view. The domical structure also reduces the cost of construction and operation by reducing the support structure and improving lighting and climate control. Domical structure according to the present invention also includes means for easily transferring waste and materials between different areas or processing portions of a waste-to-energy facility and for reducing downwash airflow characteristics associated with wind patterns in the wake of tall chimneys and rectangular structures.

6 Claims, 3 Drawing Sheets

COMPOUND CURVATURE, DOMICAL STRUCTURE FOR WASTE-TO-ENERGY FACILITIES

FIELD OF THE INVENTION

The present invention relates to a building structure for housing and integrating with waste-to-energy or other waste processing facilities. More specifically, it relates to a domical structure capable of enclosing the majority of the operational and structural elements of a waste-to-energy facility.

BACKGROUND OF THE INVENTION

Americans throw away more trash per person than any other country in the world. Total municipal solid waste requiring disposal each year is still growing and is projected to exceed 200 million tons by the year 2000. Over three-fourths of this waste is currently buried in approximately 6,000 landfills across the country. Increasingly stringent landfill regulations, costs and availability of property, and recent data that suggests the health risk impact of landfills on the environment, has created a situation in which many operating landfills have been forced to shut down permanently, with new landfills delayed or postponed indefinitely.

Waste-to-energy facilities, which convert the waste into usable steam and electrical energy, are an alternative to landfilling. The United States Environmental Protection Agency, in its 1989 Agenda for Action, highlighted the importance of waste-to-energy as a disposal tool available to communities today. Waste is turned into a domestic source of renewable biomass energy, lessening dependence on foreign oil and domestic fossil fuels for energy production and, at the same time, protecting health and the environment from the impacts of landfilling and other forms of waste disposal. However, the siting of waste-to-energy facilities and other waste processing facilities has met increased resistance from local community groups. A waste-to-energy facility consists of equipment housed in structures of a variety of sizes and shapes, the majority of which are attached while others are free standing. Typically, structures are enclosed with metal siding while some equipment remains visible outside the structures. These enclosures and equipment are generally large structures which require extensive support and foundations. This combination of buildings and external equipment can lead to facilities that are not aesthetically pleasing or in harmony with the surrounding community. This increases resistance to such facilities and limits the ability to site them. Generally, other types of waste processing facilities have similar structures and difficulties.

Construction of these facilities is expensive due to the extensive support structures required for the buildings. These facilities also require significant amounts of energy for lighting and climate control within the various structures which form the facility. In addition, the expense of these facilities can increase when maintenance and operational personnel have to work outdoors in inclimate situations.

Therefore, a need exists for a more aesthetically pleasing facility which houses the majority of the processing equipment and structures of the processing facility under one envelope. A need also exists for a structural system which reduces foundation and support requirements and their associated costs. A need also exists for a structural system which improves construction, operational and maintenance conditions.

SUMMARY OF THE INVENTION

Therefore, it is an object of the present invention to provide an aesthetically pleasing, lightweight structural envelope for enclosing the majority of the elements of a waste-to-energy facility. It is another object of the present invention to reduce the structural and foundation needs by reducing support structures by better balancing of stresses and minimizing wind loads and downwash characteristics. It is another object of the present invention to reduce operating costs by providing improved ventilation, climate control, and lighting and to reduce the capital cost of noise containment within a single enclosed structure.

These and other objects of the present invention are achieved by a lightweight domical structure of symmetrical spherical, elliptical or trapezoidal dimensions enclosing the majority of the waste-to-energy facility. The structure minimizes the support requirements and construction costs by reducing the number of separate and/or contiguous buildings and, due to its inherent structural properties, providing a lightweight system which better balances forces and loads. Ventilation and climate control is improved through the use of open areas or louvers in the domical structure and by taking advantage of the different temperature zones within the domical structure through the cross-ventilation or natural drafting of the processing facilities. A total or partial translucent dome reduces lighting costs by allowing the passage of sunlight and/or the use of reflective lighting. With these and other objects, aspects and advantages of the present invention as may become hereafter apparent, the nature of the invention may be more clearly understood from the following description, the attached figures and the appended claims herein.

DETAILED DESCRIPTION OF THE PREFERRED EMBODIMENTS

Figure 1:
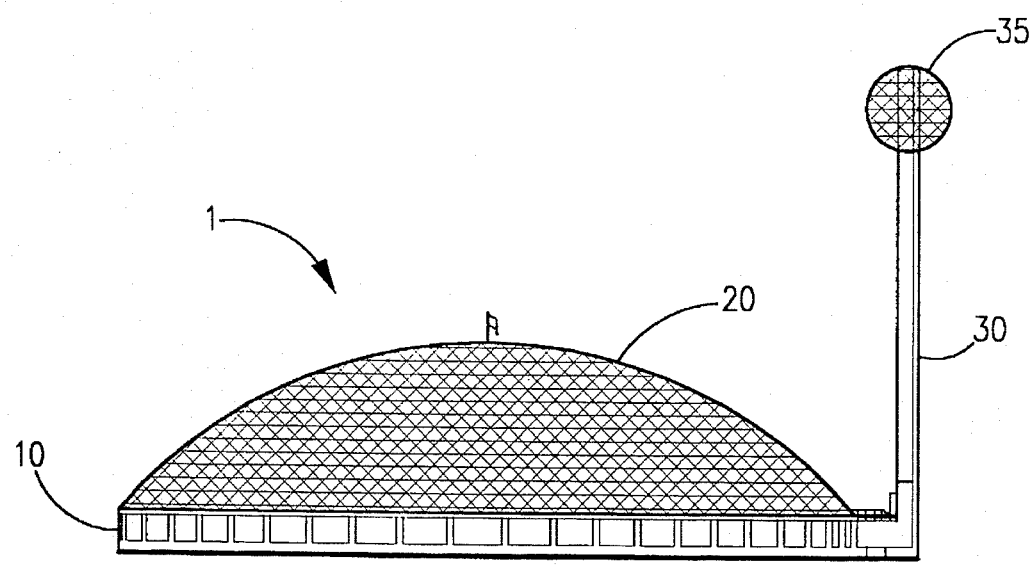
FIG. 1 is a side view of a domical structure for a waste-to-energy facility according to a preferred embodiment of the present invention.

Referring now in detail to the drawings wherein like parts are designated by like reference numerals throughout, there is illustrated in FIG. 1 a domical structure 1 for a waste-to-energy facility, waste transfer facility, recycling facility, or other waste processing facility. The domical structure 1 consists of a perimeter wall 10 which encircles the majority of the components of the waste processing facility. The retaining wall 10 supports a domed roof 20. Although the domed roof 20 is preferably of partial spherical shape, as illustrated, other shapes are contemplated by the present invention. Elliptical, trapezoidal, omni-triangulated, or other compound curvature structures which can accommodate the majority of the facility's processing equipment can be used. The facility chimney 30, in the case of waste-to-energy facility, may be external to the domical structure 1 and can include a similar domical or spherical structure 35 at or near the location of the test ports and Continuous Emissions Monitoring equipment or at the top of the chimney, to house the equipment and maintenance personnel and to enhance the aesthetic nature of the entire facility.

In addition to enhanced aesthetics, the domical structure 1 improves building strength and reduces construction costs. The domical structure 1 balances structural stresses and reduces wind load and downwash characteristics. This permits less material to be used to construct the domical structure. It also reduces the weight and, thus, the required support and foundation structure. Maintenance is also reduced since repairs of processing equipment can be performed inside the domical structure 1, while the quantity of structural components requiring maintenance and frequency of maintenance is reduced. Finally, construction time and costs are reduced since the domical structure 1 may be erected in the early stages of construction. Construction of the interior waste processing facility is then independent of weather conditions and may proceed around the clock.

Figure 2:
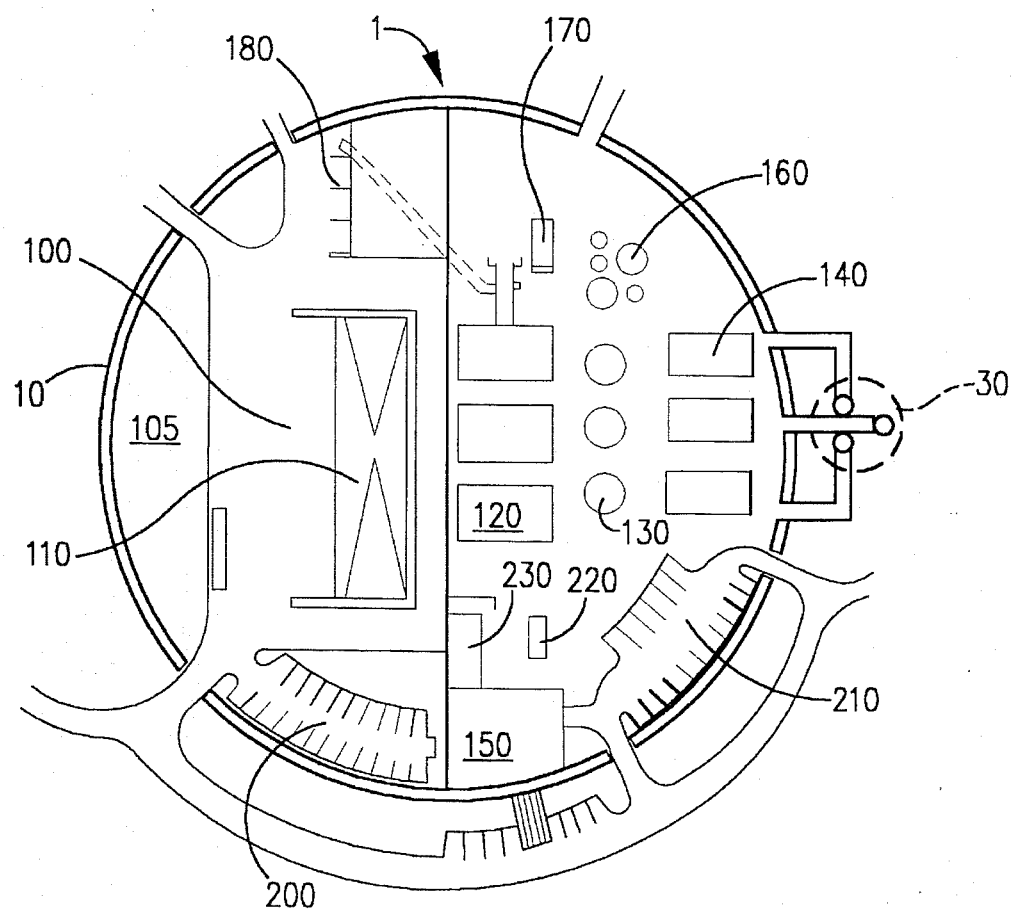
FIG. 2 is a cross-sectional plane view of the components of the waste-to-energy facility according to a preferred embodiment of the present invention.

FIG. 2 illustrates placement of the various components of a waste-to-energy facility within the domical structure 1 according to a preferred embodiment. As illustrated in FIG. 2, the perimeter wall 10 is of circular shape. However, it could be elliptical, trapezoidal or other symmetric or asymmetric shape so as to accommodate the majority of the necessary parts for the waste-to-energy facility. The principal elements of the facility are 100-foot high boilers 120 which are used to burn the refuse and generate steam. Preferably, these are located near the center of the domical structure 1 so as to reduce the necessary height of the structure and to improve interior ventilation and climate control. The tipping area 100 and refuse pit 110 are enclosed within the facility to control odors, contain fugitive noise, fugitive dust and rainwater runoff which can otherwise result. They are located adjacent to the boilers 120 to ease transfer of the waste to the boilers for burning.

The steam produced by the boilers is fed to turbine generators 220 located adjacent to the boilers which produce electricity. In steam only producing facilities, there may be no turbine generators and steam is piped directly to the end user external to the domical structure 1. The control system 230 for monitoring and controlling operation of the entire facility is also located adjacent to the boilers.

Areas designed for air pollution control equipment consisting primarily of, but not limited to, scrubbers 130 and bag house filters 140, waste water treatment 160, ash recycling and storage 180, ash transfer 170, and administration 150 are included under the domical structure 1. Air pollution equipment is used to process the combustion air and the flue gas produced in the boilers. The ash can be sifted to recover various materials for recycling, using known methods. Such methods include ferrous recovery, non-ferrous recovery, and ash aggregate processing. Furthermore, pre-combustion recycling can be performed in the area 105 between the perimeter wall 10 and the pit 110, reducing the waste to be burned and the resulting ash generated. In order to improve the aesthetic nature surrounding the facility, parking areas 200, 210 are also included inside the structure. When required for site conditions, most types of cooling towers (not shown) would still need to be placed outside the domical structure 1 for proper operation. External noise levels are reduced by the placement of all major components of the facility under the domical structure 1.

Figure 3:
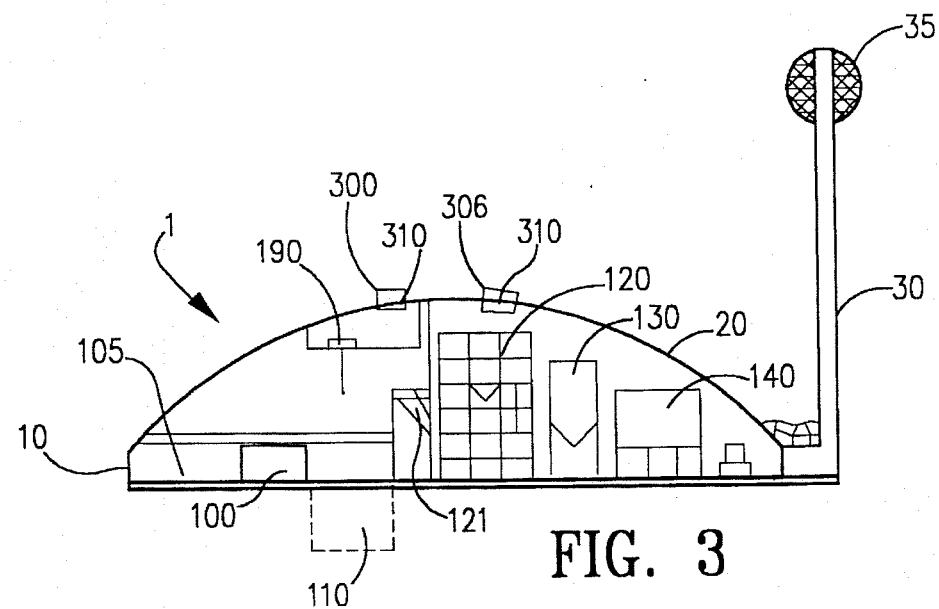
FIG. 3 is a cross-sectional elevation view of the waste-to-energy facility according to a preferred embodiment of the present invention.

The inclusion of the major components of the waste-to-energy facility under a single domical structure 1 eases transfer of material, principally waste and ash, from one area of the facility to another and increases the level of environmental protection. As shown in FIG. 3, a crane 190 may be suspended from the inside surface of the domed structure 20. The crane 190 is used for moving material from the various portions of the structure to other portions, such as waste from the pit 110 through chute 121 to the boilers 120.

Figure 4:
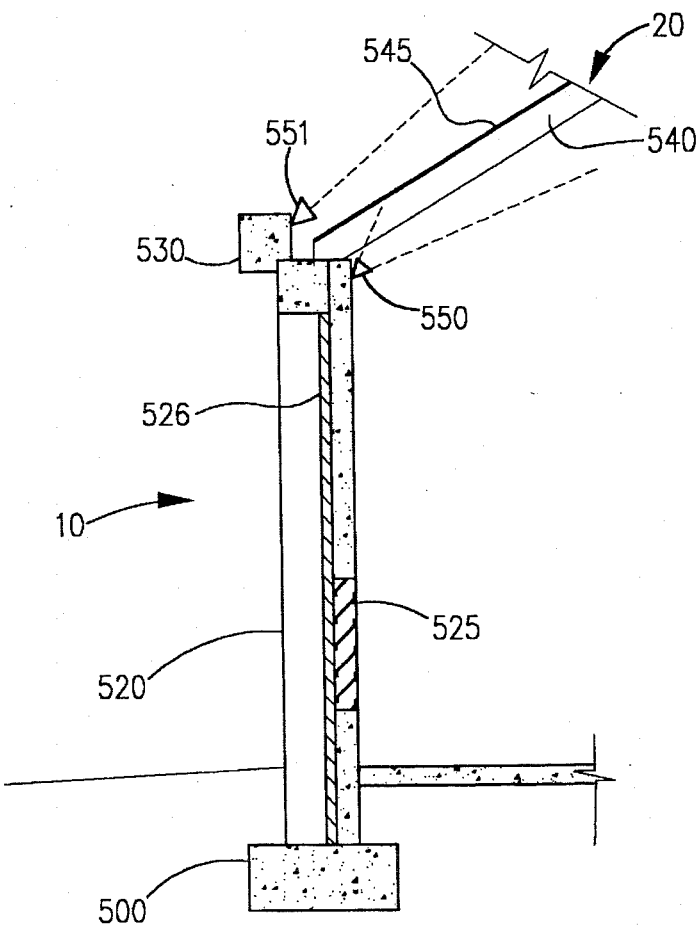
FIG. 4 is a partial cross-sectional view of the waste-to-energy facility showing the design of the wall and roof structure.

FIG. 4 illustrates design of the perimeter wall 10 of the domical structure 1. A foundation 500 supports columns 520 on which the domed structure 20 rests. A tension ring 530 surrounds the perimeter wall 10 at the upper portion where the domed structure 20 is attached. The wall 521 itself consists of siding 526 or louvers 525 between the columns 520. The louvers 525 are used to provide improved ventilation inside the domical structure 1. Openings 310 at the apex of the domed structure 20 in connection with the louvers 525 surrounding the retaining wall induce a natural ventilation of the domical structure 1. Under certain climatic conditions, fans 300 may be utilized to assist in circulation of air. The domed structure 20 is constructed of support members 540 and a dome skin 545 on the exterior of the support members 540. All or a portion of the dome skin 545 can be made of a translucent material which permits sunlight to enter the structure to improve visibility and reduce lighting costs. In addition, lighting of the domical structure 1 can be effectuated through the use of interior lights 550 or exterior lights 551 which are directed towards the domed structure 20. The interior lights 550 provide reflective lighting to the entire facility. In addition, other interior lights (not shown) can be attached to the domed structure 20 at other locations for sufficient lighting of the entire domical structure 1.

Figure 5:
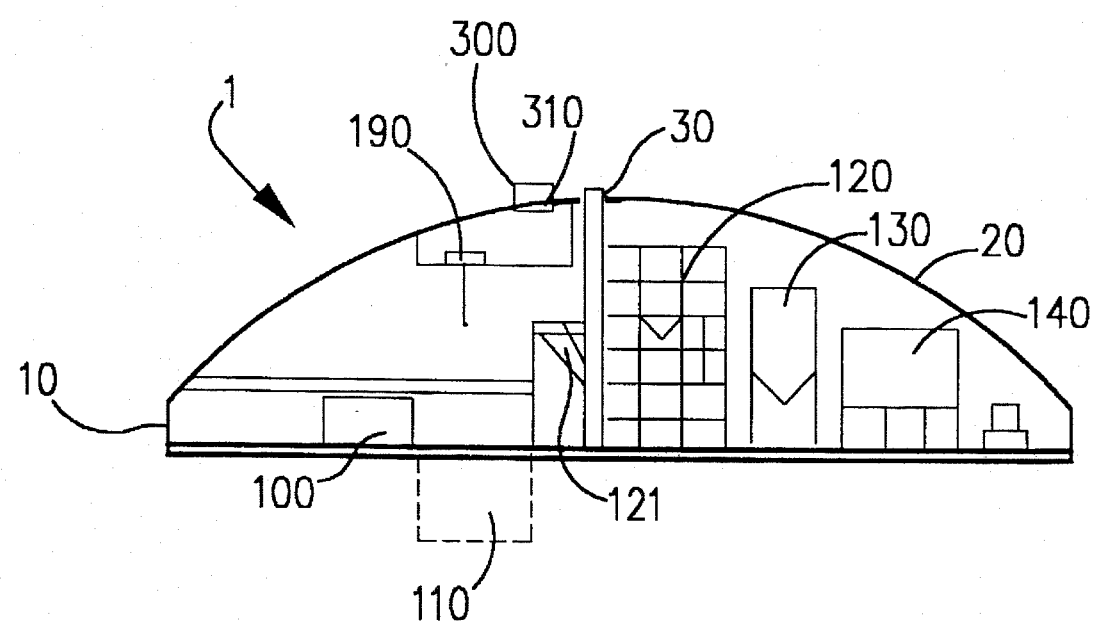
FIG. 5 is a cross-sectional elevation view of the waste-to-energy facility according to a second preferred embodiment of the present invention.

FIG. 5 illustrates a second embodiment of the present invention wherein the chimney 30 is located in the domical structure as close as possible to its apex. The aerodynamic shape of the domical structure 1 may create a wind flow pattern which reduces downwash at the chimney 30. Reducing downwash allows the chimney to be shortened, which consequently reduces construction and maintenance costs and reduces the visual intrusion of the facility on the surrounding community. The reduced downwash effect can be further enhanced by the inclusion of pressure equalization means. The pressure equalization means would include natural ventilation characteristics and/or additional openings in the domical structure 1 to direct air flow patterns around and through the facility. Fans 300 and instrumentation (not shown) can be used to improve and better control and monitor airflow for equalizing pressure.

Although a preferred embodiment is specifically illustrated and described herein, it will be appreciated that modifications and variations of the present invention are covered by the above teachings and within the perview of the appended claims without departing from the spirit and intended scope of this invention.

What is claimed is:

1. A structure that encloses a facility which employs a combustion process that exhausts waste gases, the structure comprising:

a domical structure enclosing the facility, wherein said domical structure has a top portion including an apex; and a chimney integrated with said domical structure for venting the waste gases, wherein said chimney is located in the top portion of said domical structure;

wherein the integration of said domical structure and said chimney aerodynamically disperses the waste gas and reduces downwash.

2. The structure according to claim 1, wherein the facility includes:

tipping means for depositing waste or other fuel material to said facility;

refuse or other fuel storage means for storing said inputted waste or other fuel material;

boiler means for converting said waste or other fuel material to energy;

ash transfer means for removing ash from said boiler means;

water treatment means for processing water used in said boiler means; and combustion air and flue gas treatment means for processing air used and flue gas produced in said boiler means.

3. The structure according to claim 1, wherein the domical structure includes:

a perimeter wall substantially surrounding the facility; and a roof connected to and supported by a tension ring in said perimeter wall of substantially domical shape integrating portions of the facility, especially such portions relating to exhaustion of said waste gases.

4. The structure according to claim 1, wherein said domical structure is constructed of a translucent material for passing light from outside said domical structure.

5. The structure according to claim 1, wherein said domical structure and the facility provide ventilation means for ventilating said domical structure including openings in said domical structure.

6. The structure according to claim 1, further comprising pressure equalization means for reducing downwash at said chimney of the structure.

\* \* \* \* \*